(12) United States Patent
Alon

(10) Patent No.: US 10,157,323 B2
(45) Date of Patent: Dec. 18, 2018

(54) DEVICE TO PROVIDE A SPOOFING OR NO SPOOFING INDICATION

(71) Applicant: QUALCOMM Incorporated, San Diego, CA (US)

(72) Inventor: Ofir Alon, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/251,898

(22) Filed: Aug. 30, 2016

(65) Prior Publication Data

US 2018/0060680 A1 Mar. 1, 2018

(51) Int. Cl.
*G06K 9/00* (2006.01)
*G06F 21/32* (2013.01)

(52) U.S. Cl.
CPC ......... *G06K 9/00906* (2013.01); *G06F 21/32* (2013.01); *G06K 9/00248* (2013.01); *G06K 9/00261* (2013.01); *G06K 9/00281* (2013.01)

(58) Field of Classification Search
None
See application file for complete search history.

(56) References Cited

U.S. PATENT DOCUMENTS

| | | | |
|---|---|---|---|
| 8,457,367 B1 * | 6/2013 | Sipe | G06K 9/00221 382/118 |
| 8,508,338 B1 | 8/2013 | Fiddy | |
| 8,542,879 B1 | 9/2013 | Nechyba et al. | |
| 9,082,235 B2 | 7/2015 | Lau et al. | |
| 9,262,615 B2 | 2/2016 | Beloncik et al. | |
| 9,323,912 B2 | 4/2016 | Schultz et al. | |
| 2008/0002860 A1 * | 1/2008 | Super | G06K 9/00375 382/114 |
| 2008/0181508 A1 * | 7/2008 | Kaneda | G06K 9/00248 382/190 |
| 2008/0232650 A1 * | 9/2008 | Suzuki | G06K 9/00281 382/118 |
| 2008/0252745 A1 * | 10/2008 | Nakamura | H04N 5/232 348/222.1 |
| 2012/0314967 A1 * | 12/2012 | Suzuki | H04N 5/783 382/238 |
| 2013/0016882 A1 * | 1/2013 | Cavallini | G06K 9/629 382/117 |
| 2014/0169642 A1 * | 6/2014 | Law | G06K 9/00597 382/117 |
| 2016/0148066 A1 * | 5/2016 | Duenias | G06K 9/00255 382/115 |
| 2016/0335483 A1 * | 11/2016 | Pfursich | G06K 9/00899 |

* cited by examiner

*Primary Examiner* — Ryan P Potts
(74) *Attorney, Agent, or Firm* — Hunter Clark PLLC

(57) ABSTRACT

Aspects may relate to a device to provide a spoofing or no spoofing indication. The device may comprise a processor and a sensor. The sensor may receive multiple facial frames of a face of a user. The processor coupled to the sensor may be configured to: perform a function based upon components of the face of the user relative to one another to determine measured facial features for two adjacent frames of the multiple facial frames; and determine whether the measured facial features for the two adjacent frames are sufficiently different to indicate liveness of the user and no spoofing attempt.

19 Claims, 5 Drawing Sheets

DEVICE TO PROVIDE A SPOOFING OR NO SPOOFING INDICATION

BACKGROUND

Field

The present invention relates to a device to provide a spoofing or no spoofing indication.

Relevant Background

When using visual biometrics for facial authentication, one of the most common attacks is spoofing—in which, an attacker creates a fake face of a legitimate user, and places it in front of the device's camera—attempting to trick the device into believing that the legitimate owner is indeed attempting to operate the device.

Fake faces may be implemented by a printed still image (e.g., on paper) or a digital still image (e.g., displayed on a digital screen of a device). For example, an attacker will often use excellent paper-print quality or excellent digital display in order to ensure the highest quality of the spoof compared to the real user's face.

Therefore, there is a need for spoof-detection for visual biometric facial authentication.

SUMMARY

Aspects may relate to a device to provide a spoofing or no spoofing indication. The device may comprise a processor and a sensor. The sensor may receive multiple facial frames of a face of a user. The processor coupled to the sensor may be configured to: perform a function based upon components of the face of the user relative to one another to determine measured facial features for two adjacent frames of the multiple facial frames; and determine whether the measured facial features for the two adjacent frames are sufficiently different to indicate liveness of the user and no spoofing attempt.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the terms "device", "computing device", or "computing system", may be used interchangeably and may refer to any form of computing device including but not limited to laptop computers, personal computers, tablets, smartphones, system-on-chip (SoC), televisions, home appliances, cellular telephones, watches, wearable devices, Internet of Things (IoT) devices, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, desktop computers, servers, or any type of computing device or data processing apparatus.

Figure 1:
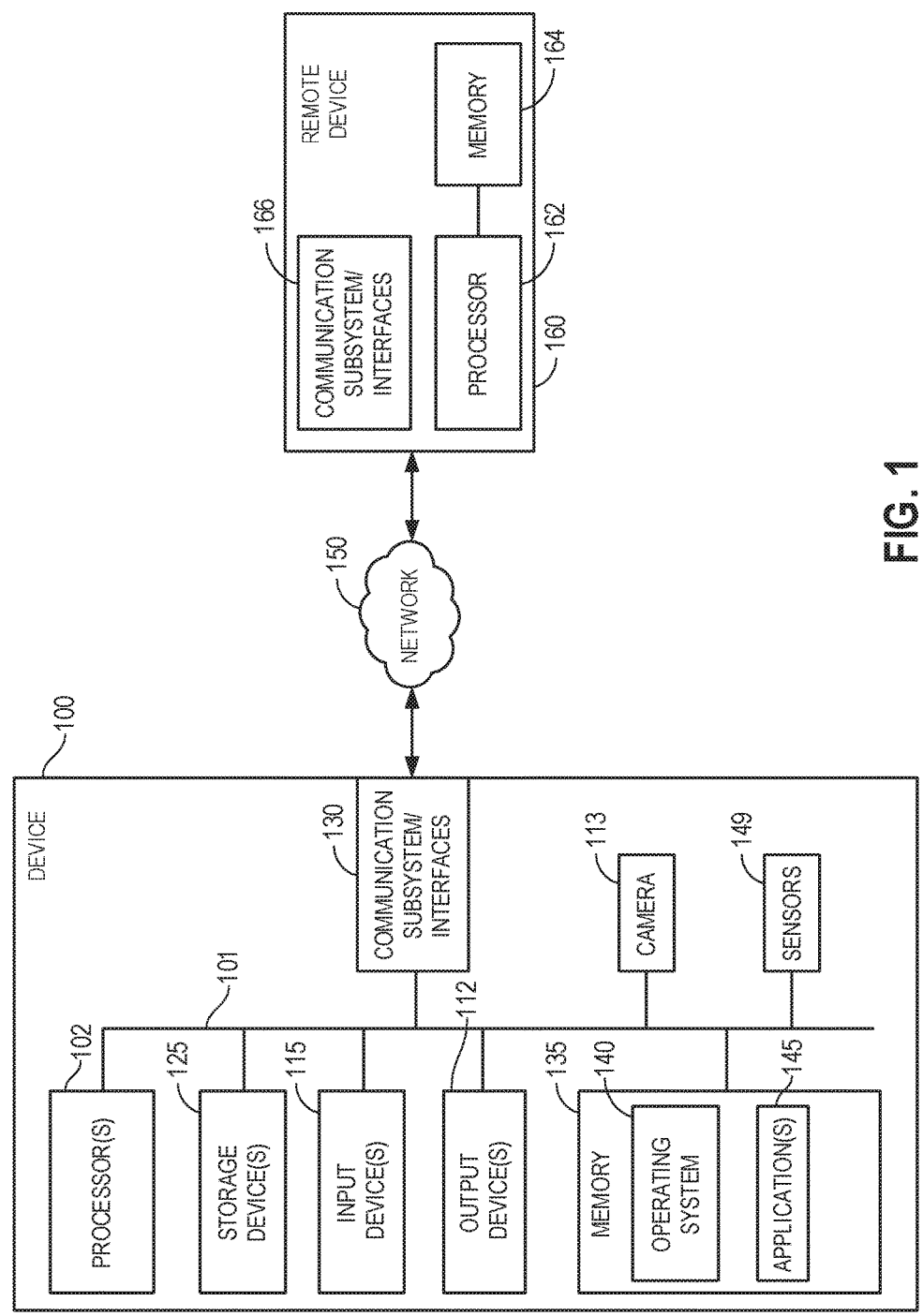
FIG. 1 is a diagram of a device in which embodiments may be practiced.

With reference to FIG. 1, an example device 100 may be alone or in communication with one or more other remote devices 160, respectively, via a network 150. For example, remote device 160 may be a service provider (e.g., finance, commerce, medical, government, corporate, social networking, etc.) that provides services based on data exchanges with device 100 through the network 150. For example, remote device 160 may be a device having at least a processor 162, a memory 164, an interface/communication subsystem 166, as well as other hardware and software components, to implement operations. It should be appreciated that device 100 and remote device 160 may be in communication through network 150 in a wireless, wired, or a combination of wireless/wired fashion.

Referring particularly to device 100, as an example, device 100 may comprise hardware elements that can be electrically coupled via a bus 101 (or may otherwise be in communication, as appropriate). The hardware elements may include one or more processors 102, including without limitation one or more general-purpose processors and/or one or more special-purpose processors (such as secure processors, digital signal processing chips, graphics acceleration processors, and/or the like); one or more input devices 115 (e.g., keyboard, keypad, touch-screen, mouse, etc.); and one or more output devices 112—such as a display device (e.g., a display screen), speaker, etc. Additionally, device 100 may include a wide variety of sensors 149. Sensors may include: an ambient light sensor (ALS), a biometric sensor, an accelerometer, a gyroscope, a magnetometer, an orientation sensor, a fingerprint sensor, a weather sensor (e.g., temperature, wind, humidity, barometric pressure, etc.), a Global Positioning Sensor (GPS), an infrared (IR) sensor, a proximity sensor, near field communication (NFC) sensor, a microphone (e.g., for voice scans), or any type of sensor. In one particular embodiment, as will be described in more detail hereafter, one of the sensors may be a camera 113. As will be described, camera 113 may be utilized to obtain facial and/or eye scans.

Device 100 may further include (and/or be in communication with) one or more non-transitory storage devices or non-transitory memories 125, which can comprise, without limitation, local and/or network accessible storage, and/or can include, without limitation, a disk drive, a drive array, an optical storage device, flash memory, solid-state storage device such as appropriate types of random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

Device 100 may also include communication subsystems and/or interfaces 130, which may include without limitation a modem, a network card (wireless or wired), a wireless communication device and/or chipset (such as a Bluetooth device, an 802.11 device, a Wi-Fi device, a WiMax device, cellular communication devices, etc.), and/or the like. The communications subsystems and/or interfaces 130 may permit data to be exchanged with other remote devices 160 (e.g., service providers, etc.) through an appropriate network 150 (wireless and/or wired), as previously described.

In some embodiments, device 100 may further comprise a working memory 135, which can include a RAM or ROM device, as described above. Device 100 may include firmware elements, software elements, shown as being currently located within the working memory 135, including an operating system 140, applications 145, device drivers, executable libraries, and/or other code. In one embodiment, an application may be designed to implement methods, and/or configure systems, to implement embodiments, as described herein. Merely by way of example, one or more procedures described with respect to the method(s) discussed below may be implemented as code and/or instructions executable by a device (and/or a processor within a device); in an aspect, then, such code and/or instructions can be used to configure and/or adapt a device 100 to perform one or more operations in accordance with the described methods, according to embodiments described herein, with respect to authenticating or not authenticating a user based upon a scan of a user's face.

A set of these instructions and/or code may be stored on a non-transitory computer-readable storage medium, such as the storage device(s) 125 described above. In some cases, the storage medium might be incorporated within a computer system, such as device 100. In other embodiments, the storage medium might be separate from the devices (e.g., a removable medium, such as a compact disc), and/or provided in an installation package, such that the storage medium can be used to program, configure, and/or adapt a computing device with the instructions/code stored thereon. These instructions might take the form of executable code, which is executable by device 100 and/or might take the form of source and/or installable code, which, upon compilation and/or installation on device 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

Many devices have various working modes for cameras 113 and displays 112. For example, lower-resolution frames may be outputted through camera 113 at higher frame rates to provide "slow-motion video". For example, video may be recorded by a camera 113 at a "high" frame rate (e.g., 120 frames per second (FPS)) and then be played back through an output display 112 at a "normal" frame rate (e.g., 30 FPS) obtaining an effect of 4× slow motion.

Embodiments described herein may utilize higher-frame rate camera modes, e.g., through camera 113, in order to detect spoofed visual facial inputs.

As an example, a spoofed visual facial may be displayed by a display of another device, in which, such displayed output frames may be at a maximum of 60 FPS. If the camera 113 of device 100 is pointed at the display of the other device and is recording at a rate which is higher than 60 FPS (e.g., 90, 120 or 240 FPS), processor 102 of device 100 analyzing the recording of the consecutive facial frames from camera 113 may determine that neighboring frames from the display of the other device have not been refreshed and are similar—almost showing the exact same output frame. In this case, processor 102 of device 100 can determine that this is a spoofed facial image from another display (e.g., not an authentic facial image from a real user), such the processor 102 may issue a spoofing indication command. As an example, a user facial movement may be requested. This requested user facial movement may be recorded by camera 113 (e.g., an eye blink, raising an eyebrow, moving a lip, moving a cheek, moving head side to side, moving a nose, etc.) such that two adjacent similar frames (that are expected to be dynamic and all different) analyzed by processor 102 are indicative of facial frames with no meaningful change, which exposes a spoof attempt. On the other hand, if none the adjacent frames of the multiple facial frames of the user performing the requested facial moves are determined to be similar, the user facial input may be regarded as valid, and a no spoofing indication command may be issued.

In one embodiment, device 100 may be used to determine and provide a spoofing or no spoofing indication based upon a user's facial input. Device 100 may include a sensor 149 to receive multiple facial frames of a face of the user and processor 102 is coupled to the sensor 149. Processor 102 may be configured to: perform a function based upon components of the user's face relative to one another to determine measured facial features for two adjacent facial frames of the multiple facial frames. Further, processor 102 may determine whether the measured facial features for two adjacent facial frames indicate that the two adjacent facial frames are sufficiently different to indicate a liveness of the user and no spoof attempt. In particular, if none of the adjacent frames of the multiple facial frames are determined to be similar, processor 102 may be configured to command a no spoofing indication. Thus, if none of the multiple facial frames of the user performing the facial moves are determined to be similar, the user facial input may be regarded as valid and a no spoofing command issued. In this case, of no spoofing being determined, the liveness of the user has been established. In the case of a no spoofing indication, authentication steps may further be performed.

On the other hand, if adjacent facial frames of the multiple facial frames are determined by processor 102 to not be sufficiently different or similar, processor 102 may be configured to command a spoofing indication, indicating that a spoof has been attempted. In this case, of spoofing being determined, the liveness of the user has not been established. It should be appreciated that in some embodiments, a binary indication of a spoof attempt is determined: a spoofing indication or a no spoofing indication. In other embodiments, a spoofing score may be determined indicating a numerical value, percentage, etc., of the probability of a spoof attempt. Further, in one embodiment, sensor 149 may be a camera 113 and will hereafter be referred to as camera 113. However, as will be described in more detail hereafter, other types of sensors may be utilized.

In one embodiment, components of the user's face relative to one another to perform the function to determine measured facial features may be related to: raising an eyebrow; moving a lip; moving a cheek; moving a head side to side; or moving a nose. It should be appreciated that these are just examples and that any facial movement may be utilized. In one embodiment, the components of the user's face relative to one another to perform the function to determine measured facial features are related to an eye blink. For example, in the eye blink implementation, the components of a user's face relative to one another to perform the function to determine measured facial features may include the eye pupil and the eye lid of an eye, in which, the measured facial features determined are based upon the distance between the eye pupil and the eye lid, as will be described in more detail hereafter. In particular, as one example, the distance between the eye pupil and the eye lid is based upon a linear geometric distance between the center of the eye pupil and the edge of the eye lid.

Figure 2:
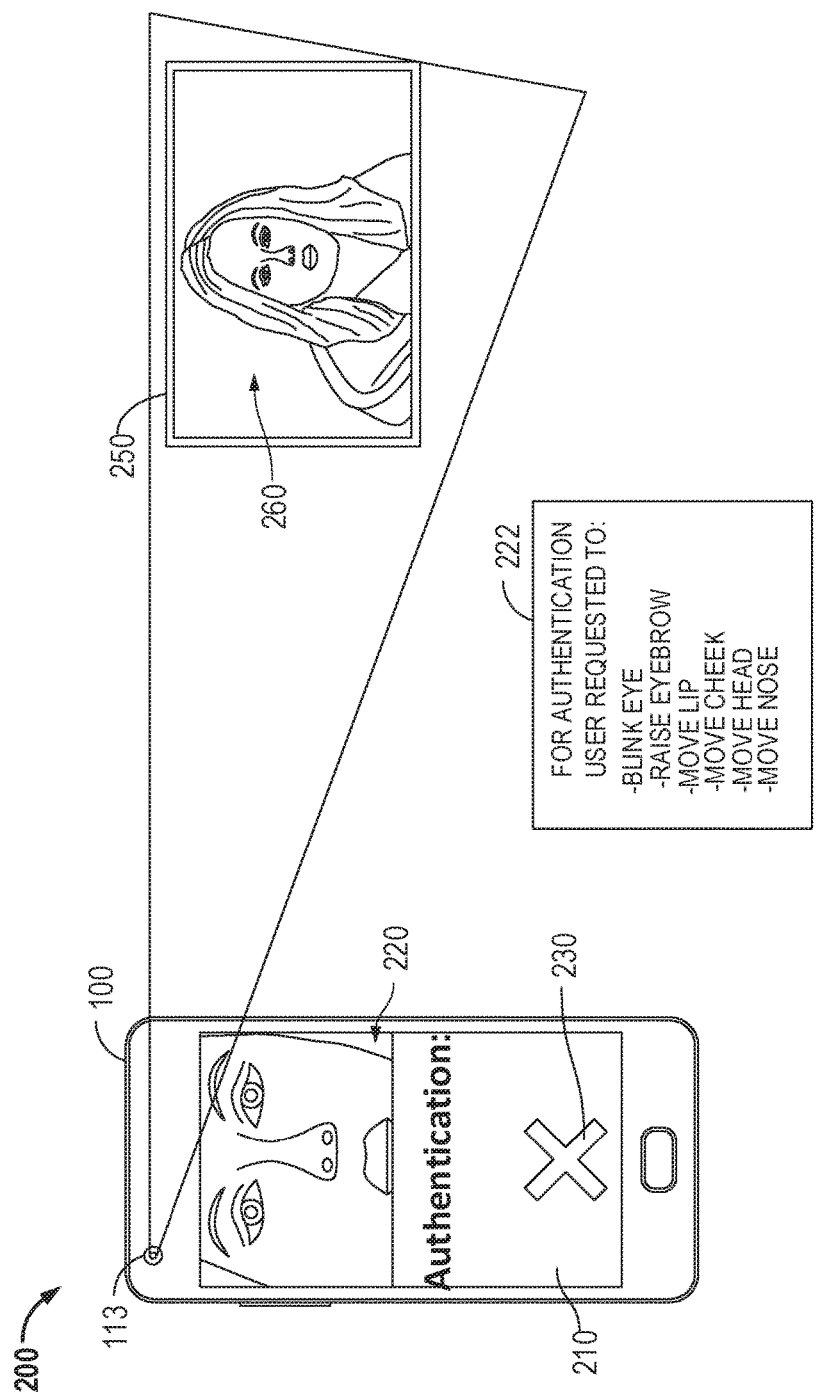
FIG. 2 is a diagram showing a device to determine whether a spoof attempt has occurred and to provide a spoofing or no spoofing indication.

With additional reference to FIG. 2, an example of a device 100 to determine whether a spoof attempt has occurred and to provide a spoofing or no spoofing indication based upon a facial movement of a user will be described. In particular, FIG. 2 shows a methodology 200 utilizing device 100 to determine whether a spoof attempt has occurred based upon a facial movement of the user. To begin with, device 100 operating under the control of processor 102 may ask a user to provide a facial movement to identify themself as valid user. Examples of requested facial movements 222 may include: blink an eye; raise an eyebrow; move a lip; move a cheek; move the head side to side; move a nose, etc. The requested facial movements 222 may be to unlock device 100 and/or to utilize particular types of applications or functions of device 100. The requested facial movement 222 for unlocking device 100 and/or utilizing particular types of applications or functions may be preset by the user or may be particularly selected or randomly selected by the device 100. As has been previously described, if no spoofing attempt has been determined, a no spoofing indication may be determined and commanded, and unlocking and/or usage may occur and/or further authentication steps may be performed, whereas, if a spoofing attempt has been determined, a spoofing indication may be determined and commanded, and unlocking and/or usage will not occur.

Continuing with the methodology 200, based upon the requested user facial movement, camera 113 records the requested facial movement 220 allegedly performed by the user 260. Based upon the recorded facial movement 220 by camera 113 of the user's 260 alleged facial movement, processor 102 of device 100 performs a mathematical function based upon components of the users face relative to one another to determine measured facial features for the recorded multiple facial frames. If processor 102 of device 100 determines that two adjacent facial frames are not sufficiently different or are similar (e.g., limited or no measurable movement and/or limited or no measurable changes in measured facial features), then based upon the two similar facial frames, processor 102 of device 100 will issue a command to display on display 210 of device 100 that the user is not approved—i.e., there is a possible spoof. For example, device 100 may display an X 230 on display 210 to indicate that the user is not approved. However, if none of the recorded adjacent facial frames are determined to be similar, processor 102 may issue a command that the user is approved and the device 100 may be unlocked and/or particular applications or functions of device 100 may be approved for use or further authorization techniques may take place.

As an example, with particular reference to FIG. 2, a spoofing attempt may be to use a display of another device 250 (e.g., any type of device with a display) displaying a picture of the user's face and/or a movement of the user's face (e.g. previously recorded) 260 in order to spoof device 100 to potentially allow the user to unlock the device and/or use particular applications/functions of the device 100. However, when displayed on a display of another device 250, the user facial movement (e.g., an eye blink, raising an eyebrow, moving a lip, moving a cheek, moving head side to side, moving a nose, etc.) recorded by camera 113 of device 100 will result in two or more similar adjacent frames (e.g., not sufficiently different) being recorded and analyzed by processor 102 of device 100 that are indicative of facial frames with no meaningful change, which exposes the spoof attempt (e.g., no liveness). On the other hand, if the real user is performing the requested facial movement (e.g., an eye blink, raising an eyebrow, moving a lip, moving a cheek, moving head side to side, moving a nose, etc.) then none of the adjacent frames of the multiple facial frames recorded will be determined to be similar (e.g., all will be determined as being sufficiently different) such that the user facial input will be regarded indicating liveness and will be considered valid such that the device 100 may be unlocked and/or the use of particular applications/functions of the device 100 may be approved or further authentication steps may be performed to allow for unlocking and/or usage.

Thus, by utilizing embodiments in which a function is performed based upon components of the user's face relative to one another to determine measured facial features for each facial frame of multiple facial frames, and if two adjacent facial frames are determined to be similar, then it is determined to be most likely a fake facial display of a user either implementing a spoofed picture of the user's face or a spoofed pre-recorded movement of the user's face in which the pre-recorded facial movement is being utilized in an attempt to spoof the device 100. In this case, device 100 will identify the spoof attempt. In this way, the previously described embodiments prevent the spoofing. As has been described, by camera 113 of device 100 being pointed at the display of the other device and is recording at a rate which is higher, device 100 analyzing the recording of the consecutive facial frames from camera 113 may determine that neighboring adjacent frames from the display of the other device have not been refreshed and are similar—almost showing the exact same output frame, to indicate a spoof attempt.

Figure 3:
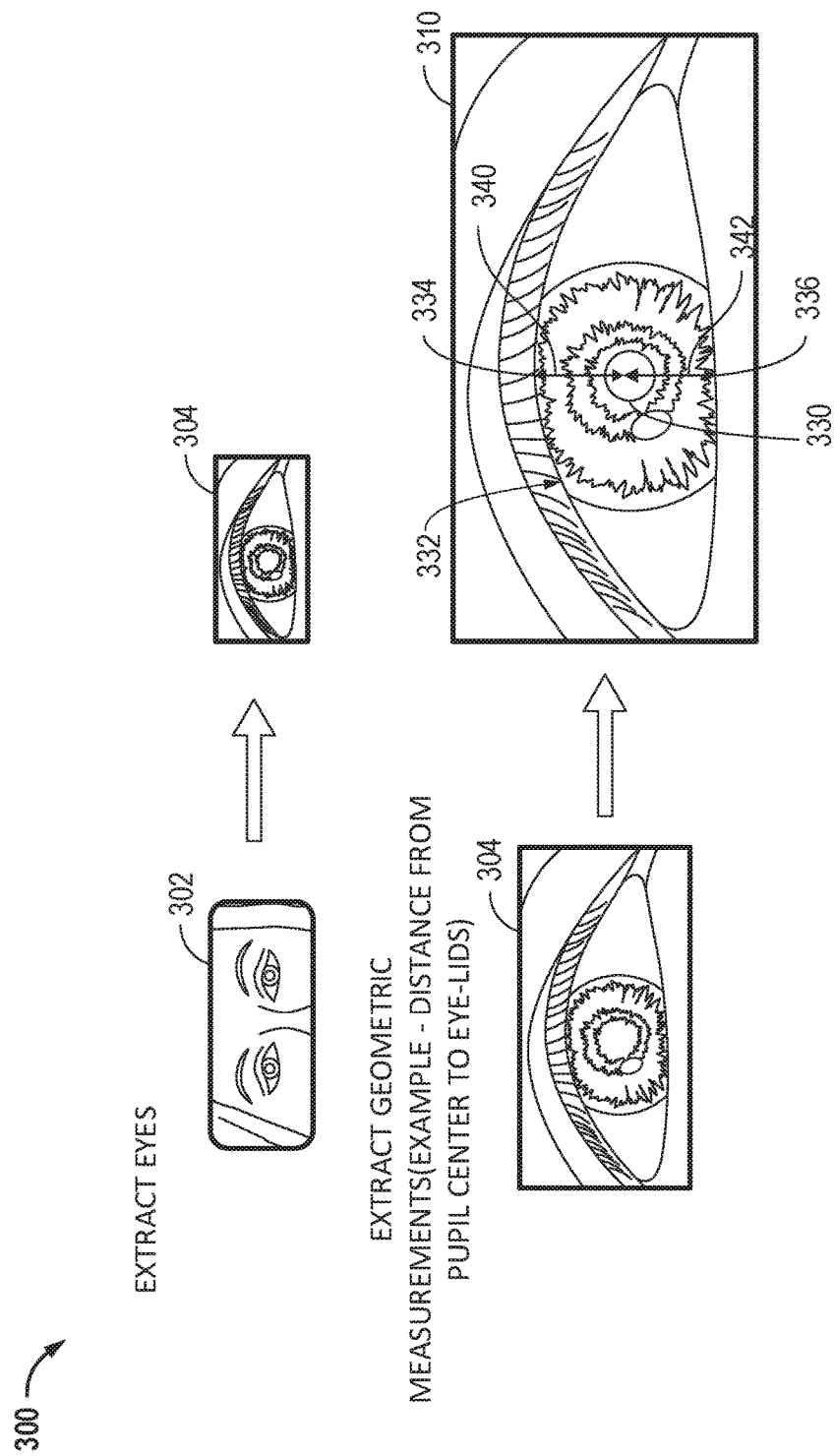
FIG. 3 is a diagram showing an example of utilizing components of the user's face to perform the function of determining measured facial features related to an eye blink.

With additional reference to FIG. 3, a particular example of utilizing components of the user's face to perform the function of determining measured facial features related to an eye blink will be described. As can be seen in FIG. 3, example 300 shows that one or more of the user's eyes 304 are extracted from the recorded camera image 302 to particularly focus upon a user's eye 304. In particular, in one embodiment, linear geometric measurements, as shown in block 310, are measured with respect to components of the user's eye to determine distances related to an eye blink. As can be seen in block 310, the following components of the user's eye in the eye blink are focused on. In particular, these include: the pupil 330, the upper portion 334 of the eye lid 332, and the lower portion 336 of the eye lid 332. In one embodiment, in order to determine the measured facial features related to the eye blink, a distance 340 is measured between the center of the pupil 330 and the upper portion 334 of the eye lid and another distance 342 between the center of the pupil 330 and the lower portion 336 of the eye lid may be measured. As will be described, these measurements may be utilized to: determine whether two adjacent facial frames are similar or not sufficiently different, in which case a spoof operation may be occurring, and the user input will not be considered valid and approved (e.g., it may be a pre-recorded eye blink displayed on a display); or that none of the adjacent facial frames are similar (e.g., all our sufficiently different) indicating liveness and that a spoof is not being performed and the user input will be considered valid and approved (e.g., the user truly is blinking).

Figure 4:
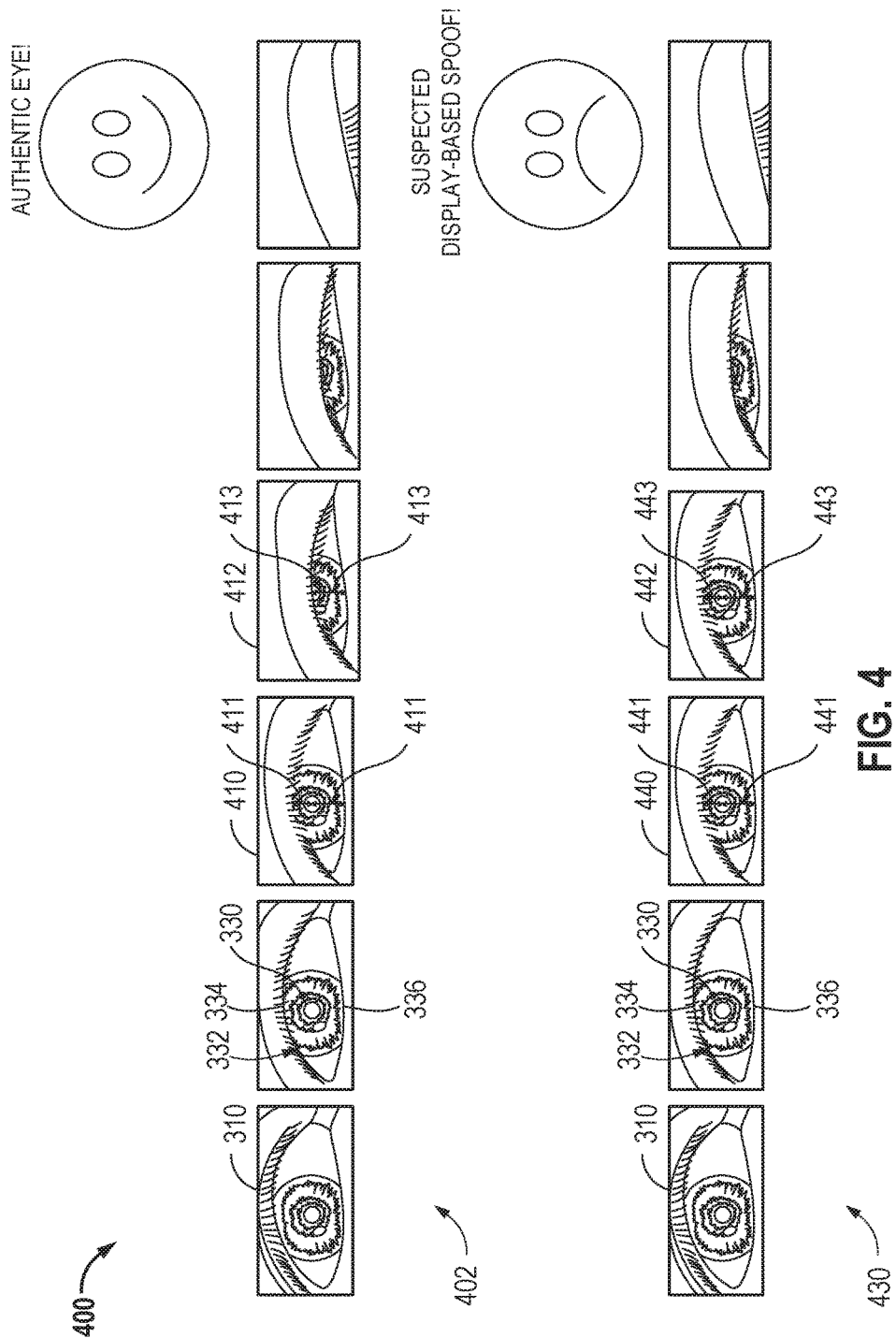
FIG. 4 is a diagram showing an example of an eye blink.

With additional reference to FIG. 4, an example 400 of an eye blink that determines a no spoofing attempt and approves a user or determines a suspected spoof attempt, will be described. As an example, a plurality of eye frames 402 of the user blinking an eye are received by camera 113 and recorded for use by processor 102 to measure facial features for each frame. For example, a first frame 310 is taken and recorded. Afterwards multiple subsequent frames are taken. For example, each frame of the eye includes the pupil 330 and the eye lid 332 including an upper portion 334 of the eye lid and a lower portion 336 of the eye lid. In particular, device 100 performs a function to determine measured facial features related to the eye blink in which the measured facial features determined are based upon a distance between the center of the eye pupil 330 and the upper or lower eye lid 332. For example, for frame 410, a distance 411 is measured from the center of the pupil to the upper portion of the eye lid and another distance 411 is measured from the center of the pupil to the bottom portion of the eye lid. The exact same measurement are taken for the next frame 412. Similarly, in frame 412, the distance 413 from the center of the pupil to the upper portion of the eye lid is measured and the distance 413 from the center of the pupil to the lower portion of the eye lid is measured. This may be done for each of the frames 402 of these plurality of frames recorded by camera 113 and calculated by the measurement functionality implemented by processor 102. As can be seen in this example, none of the distances (e.g., 411, 413) for any of the frames 402 are similar (e.g., they are all substantially different). Because none of the adjacent frames of the multiple facial frames are determined to be similar by the distances measured between the center of the eye pupils and the edges of the eye lids, processor 102 may determine that a spoof is not being attempted (e.g., the user truly is blinking (e.g., liveness)). Therefore, the user is approved with an authentic eye 420 and may be allowed to unlock the device and/or perform a particular function/application and/or further authentication techniques for unlocking, functions, application, etc., may take place. In this example, linear geometric distances between the center of the eye pupil and the edges of the eye lid are measured. However, it should be appreciated that many other geometric measurements or other types of measurements may be utilized. It should be noted that since none of the adjacent frames 402 are similar, this evidences true movement between the frames, such that device 100 may assume that the real user has truly blinked indicating liveness (e.g. no spoofing from a recording shown on a display of another device).

As another example, a plurality of eye frames 430 of the user blinking an eye are received by camera 113 and recorded for use by processor 102 to measure facial features for each frame. For example, a first frame 310 is taken and recorded. Afterwards multiple subsequent frames are taken. For example, each frame of the eye includes the pupil 330 and the eye lid 332 including an upper portion 334 of the eye lid and a lower portion 336 of the eye lid. In particular, device 100 performs a function to determine measured facial features related to the eye blink in which the measured facial features determined are based upon a distance between the center of the eye pupil 330 and the upper or lower eye lid 332. For example, for frame 440, a distance 441 is measured from the center of the pupil to the upper portion of the eye lid and another distance 441 is measured from the center of the pupil to the bottom portion of the eye lid. The exact same measurement are taken for the next frame 442. Similarly, in frame 442, the distance 443 from the center of the pupil to the upper portion of the eye lid is measured and the distance 443 from the center of the pupil to the lower portion of the eye lid is measured. This may be done for each of the frames 430 of these plurality of frames recorded by camera 113 and calculated by the measurement functionality implemented by processor 102. As can be seen in this example, the distance 441 and 443 for frames 440 and 442 are similar. Because these two adjacent facial frames are determined to be similar by the distances measured between the center of the eye pupils and the edges of the eye lids, processor 102 may determine that a spoof is being attempted (e.g., a recording shown on a display of another device). Therefore, a suspected display-based spoof 450 is determined and the user may not be allowed to unlock the device and/or perform a particular function/application. It should be noted that because adjacent frames 440 and 442 are similar (e.g., not sufficiently different), it is assumed that spoofing may be occurring from a recording shown on a display of another device and liveness is not established. As has been described, by camera 113 of device 100 being pointed at the display of the other device and is recording at a rate which is higher, device 100 analyzing the recording of the consecutive facial frames from camera 113 may determine that neighboring adjacent frames from the display of the other device have not been refreshed and are similar—almost showing the exact same output frame, to indicate a spoof attempt.

Thus, embodiments may be implemented by a device 100 having a camera 113 and a processor 102, based upon camera frame images of an eye of a user. Measurements of the center of the pupil comparative to the eye lid across multiple frames may be determined, and if no adjacent frames are similar, it shows true movement between frames, and device 100 may assume that a real user has truly blinked (e.g. no spoofing from a recorded display on a display of another device). On the other hand, if two or more adjacent frames based upon the measured distances of the eye are determined to be similar, then device 100 can assume that spoofing has occurred (e.g. a recording of a display of another device has been used) and the user is not validated or approved. Based on this, the device may not be unlocked and/or the application/function may not be allowed to be utilized.

It should be appreciated that the eye blink implementation and corresponding measurements are only examples and that other sorts of facial movements and measurements may be utilized. Examples of these may include: raising an eyebrow; moving a lip; moving a cheek; moving a head side to side; or moving a nose. Any components of the user's face relative to one another for these sources of measurements may be utilized such as: the distance measurement between an eyebrow and the tip of the nose or the other eyebrow; the distance measurement between the center of the top lip and the center of the bottom lip; the distance measurement between a portion of the cheek and the center of the nose; etc. It should be appreciated that any suitable distance measurement between different components of the face may be utilized. Additionally, it should be appreciated that the geometric linear distances are used as measurement examples but that other sources of nonlinear distances and/or angles and/or other types of measurements may be utilized.

It should be appreciated that these previously described aspects rely on the ability of the camera 113 of device 100 to sample at significantly higher frame rates when compared to the display frame rate of the display of the device displaying the multiple frames to detect spoofs. In particular, the high frame rate is higher than the ability of the display of the other device to refresh its frame. It should also be appreciated that because cameras are present on many devices the functional aspects described herein are usable on many devices.

It should be appreciated that aspects related to recording multiple camera frame images of a user's facial movement (e.g., eye blink) of the user to determine that if no adjacent frames are similar—indicating true movement between frames—that the real user has truly made the facial movement (e.g., blinked). This is opposed to a finding of similar frames—that indicates a potential spoof. In particular, by utilizing this methodology, printed still images on paper or digital still images displayed on a display device of another device will not be validated. Further, a digital display from a display of another device of an identical facial image attempting to model/imitate the face movement (e.g., imitating an eye blink) will also not be validated, as previously described. It should be appreciated that although a camera has been described as typical sensor to be used that other sensors may be used to record difference in facial movements. Examples of these types of sensors may include infrared (IR) sensors, light sensors, or any suitable sensor.

Figure 5:
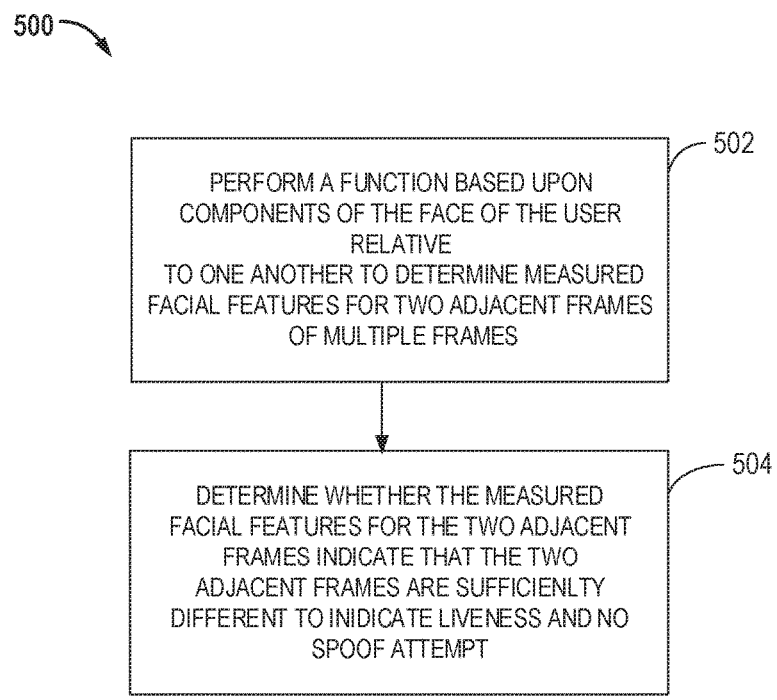
FIG. 5 is a flow diagram of process to determine a spoof attempt has not occurred.

With additional reference to FIG. 5, a process 500 to determine that a spoof attempt has not occurred is described. At block 502, a function is performed based upon components of the face of the user relative to one another to determine measured facial features for two adjacent facial frames of multiple facial frames. Next, process 500 determines whether the measured facial features for the two adjacent facial frames indicate that the two adjacent facial frames are sufficiently different to indicate liveness of the user and no spoofing attempt. (Block 504).

It should be appreciated that aspects of the previously described processes may be implemented in conjunction with the execution of instructions by a processor (e.g., processor 102) of devices (e.g., device 100), as previously described. Particularly, circuitry of the devices, including but not limited to processors, may operate under the control of a program, routine, or the execution of instructions to execute methods or processes in accordance with embodiments described (e.g., the processes and functions of FIGS. 2-5). For example, such a program may be implemented in firmware or software (e.g. stored in memory and/or other locations) and may be implemented by processors and/or other circuitry of the devices. Further, it should be appreciated that the terms device, SoC, processor, microprocessor, circuitry, controller, etc., refer to any type of logic or circuitry capable of executing logic, commands, instructions, software, firmware, functionality, etc.

It should be appreciated that when the devices are wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, 5G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., communication subsystems/interfaces (e.g., air interfaces)) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), an authentication terminal (e.g., at an airport, bank, office, etc.), a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a secure processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device comprising:
    a camera to receive multiple frames of a face of a user, the multiple frames comprising a sequence of more than two frames of the face of the user, the camera operating at a receiving frame rate higher than a display frame rate of a display device of a second device displaying the multiple facial frames such that received adjacent frames by the camera comprise content from a same displayed frame of the display device; and
    a processor coupled to the camera, the processor configured to:
        perform a function based upon components of the face of the user relative to one another to determine measured facial features for two adjacent frames of the multiple frames by determining, for each set of two adjacent frames of the multiple frames, first measured facial features for a first adjacent frame of the set of two adjacent frames and second measured facial features of a second adjacent frame of the set of two adjacent frames; and
        determine, for each set of two adjacent frames, whether the measured facial features for the first and second adjacent frames indicate that the first and second adjacent frames are sufficiently different to indicate a liveness of the user by comparing the first measured facial features and the second measured facial features.

2. The device of claim 1, wherein, if all of the adjacent frames of the multiple facial frames are determined to be sufficiently different to indicate a liveness of the user, the processor is configured to command a no spoofing indication.

3. The device of claim 1, wherein the components of the user's face relative to one another to perform the function to determine measured facial features are related to at least one of raising an eyebrow, moving a lip, moving a cheek, moving a head side to side, or moving a nose.

4. The device of claim 1, wherein the components of the user's face relative to one another to perform the function to determine measured facial features are related to an eye blink.

5. The device of claim 4, wherein the components of the user's face relative to one another to perform the function to determine measured facial features related to the eye blink include an eye pupil and an eye lid of an eye, and wherein the measured facial features determined are based upon a distance between the eye pupil and the eye lid.

6. The device of claim 5, wherein the distance between the eye pupil and the eye lid is based upon a linear geometric distance between the center of the eye pupil and the edge of the eye lid.

7. The device of claim 1, wherein the processor is further configured to:
    request that the user perform a specific facial movement;
    capture the multiple frames of the face of the user responsive to the request that the user perform the specific facial movement;
    determine whether the user has performed the specific facial movement based on the multiple frames of the face of the user; and
    provide access to the device or specific content stored thereon responsive to the user having performed the specific movement and the measured facial features being indicative of the liveness of the user.

8. A method comprising:
    receiving, using a camera, multiple facial frames of a face of a user, the multiple frames comprising a sequence of more than two frames of the face of the user, wherein receiving the multiple facial frames of the user using the camera comprises operating the camera at a receiving frame rate higher than a display frame rate of a display device of a second device displaying the multiple facial frames such that received adjacent frames by the camera comprise content from a same displayed frame of the display device;

performing a function based upon components of the face of the user relative to one another to determine measured facial features for two adjacent frames of the multiple facial frames by determining, for each set of two adjacent frames of the multiple frames, first measured facial features for a first adjacent frame of the set of two adjacent frames and second measured facial features of a second adjacent frame of the set of two adjacent frames; and determining, for each set of two adjacent frames, whether the measured facial features for the first and second adjacent frames indicate that the first and second adjacent frames are sufficiently different to indicate a liveness of the user by comparing the first measured facial features and the second measured facial features.

9. The method of claim 8, wherein, if all of the adjacent frames of the multiple facial frames are determined to be sufficiently different to indicate a liveness of the user, further comprising commanding a no spoofing indication.

10. The method of claim 8, wherein the components of the user's face relative to one another to perform the function to determine measured facial features are related to at least one of raising an eyebrow, moving a lip, moving a cheek, moving a head side to side, or moving a nose.

11. The method of claim 8, wherein the components of the user's face relative to one another to perform the function to determine measured facial features are related to an eye blink.

12. The method of claim 11, wherein the components of the user's face relative to one another to perform the function to determine measured facial features related to the eye blink include an eye pupil and an eye lid of an eye, and wherein the measured facial features determined are based upon a distance between the eye pupil and the eye lid.

13. The method of claim 12, wherein the distance between the eye pupil and the eye lid is based upon a linear geometric distance between the center of the eye pupil and the edge of the eye lid.

14. A non-transitory computer-readable medium including code that when executed by a processor, causes the processor to:

receive, using a camera, multiple frames of a face of a user, the multiple frames comprising a sequence of more than two frames of the face of the user, by operating the camera at a receiving frame rate higher than a display frame rate of a display device of a second device displaying the multiple facial frames such that received adjacent frames by the camera comprise content from a same displayed frame of the display device;

perform a function based upon components of the face of the user relative to one another to determine measured facial features for two adjacent frames of the multiple facial frames by determining, for each set of two adjacent frames of the multiple frames, first measured facial features for a first adjacent frame of the set of two adjacent frames and second measured facial features of a second adjacent frame of the set of two adjacent frames; and determine, for each set of two adjacent frames, whether the measured facial features for the first and second adjacent frames indicate that the first and second adjacent frames are sufficiently different to indicate a liveness of the user by comparing the first measured facial features and the second measured facial features.

15. The computer-readable medium of claim 14, wherein, if all of the adjacent frames of the multiple facial frames are determined to be sufficiently different to indicate a liveness of the user, further comprising code to command a no spoofing indication.

16. The computer-readable medium of claim 14, wherein the components of the user's face relative to one another to perform the function to determine measured facial features are related to at least one of raising an eyebrow, moving a lip, moving a cheek, moving a head side to side, or moving a nose.

17. The computer-readable medium of claim 16, wherein the components of the user's face relative to one another to perform the function to determine measured facial features are related to an eye blink.

18. The computer-readable medium of claim 17, wherein the components of the user's face relative to one another to perform the function to determine measured facial features related to the eye blink include an eye pupil and an eye lid of an eye, and wherein the measured facial features determined are based upon a distance between the eye pupil and the eye lid.

19. The computer-readable medium of claim 18, wherein the distance between the eye pupil and the eye lid is based upon a linear geometric distance between the center of the eye pupil and the edge of the eye lid.

* * * * *